United States Patent Office 3,346,646
Patented Oct. 10, 1967

3,346,646
SELECTIVE HALOGENATION OF KETONES
Michael Kokorudz, Southgate, Mich., assignor to Wyandotte Chemicals Corporation, Wyandotte, Mich., a corporation of Michigan
No Drawing. Filed Aug. 2, 1963, Ser. No. 299,490
20 Claims. (Cl. 260—593)

The present invention relates to a process for the production of halogenated ketones and is more particularly concerned with a method for the treatment of 1-halo-2-ketones with a hypohalite to produce 1,1,1-trihalo-2-ketones, which latter compounds are valuable and useful intermediates as is well known in the art.

Since these haloketones have considerable utility, many methods for their production have been developed. The use of free halogen in direct contact with the ketone is probably the simplest procedure, for example, according to U.S. Patent 2,199,934. However, this method is unselective, producing large quantities of undesired byproducts. Metal halides may be employed in lieu of the free halogen, as in U.S. Patent 2,567,569, but such processes have the same shortcomings as the free halogen process. Other reactions have been proposed for production of 1,1,1-trihalo-2-ketones, such as the reaction of dichlorofluoroacetyl chloride with benzene to give dichlorofluoroacetophenone and the like, as illustrated by U.S. Patent 2,824,139, but such reactions involve complicated procedures and are unduly cumbersome. It would therefore be highly desirable to have available a process for the production of such 1,1,1-trihalo-2-ketones which did not suffer from the disadvantages and complications of previously available processes.

It is accordingly an object of the present invention to provide a novel method for the conversion of 1-halo-2-ketones (by which is meant both 1-monohalo-2-ketones and 1,1-dihalo-2-ketones) to 1,1,1-trihalo-2-ketones. Another object is to provide a method of producing 1,1,1-trihalo-2-ketones in high yield and purity. Still another object is to provide a process for replacing the residual hydrogen atoms of a halomethyl group in a 1-halo-2-ketone with chlorine, bromine, or iodine atoms. Yet another object is to provide a method of producing compounds of the formula:

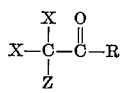

wherein each X is a halogen having an atomic weight between 18 and 128, Z is a halogen having an atomic weight between 35 and 128, and R is a non-interfering organic radical attached through a carbon atom, from compounds of the formula:

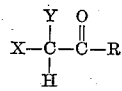

wherein X and R are as stated above, and wherein Y is a member of the class consisting of hydrogen and halogen having an atomic weight between 18 and 128. A particular object of this invention is to provide a method for transforming 1 - chloroacetone, 1,1 - dichloroacetone, and mixtures thereof, to 1,1,1-trichloroacetone in high yields and conversions. Yet a further purpose of the present invention is to provide a method of halogenating mixtures of 1-halo-2-ketones, especially those produced by the reaction of free halogen with a methyl ketone. Additional objects will be apparent to one skilled in the art and still other objects will become apparent hereinafter.

The foregoing and additional objects are accomplished by the provision of the method of the present invention.

One of the well-known reactions of organic chemistry is that of a hypohalite and a methyl ketone to produce a haloform and an acid through a scission reaction.

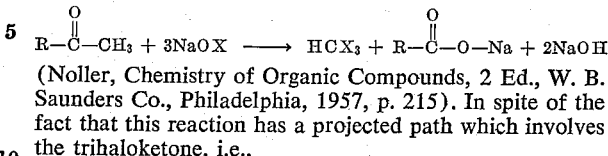

(Noller, Chemistry of Organic Compounds, 2 Ed., W. B. Saunders Co., Philadelphia, 1957, p. 215). In spite of the fact that this reaction has a projected path which involves the trihaloketone, i.e.,

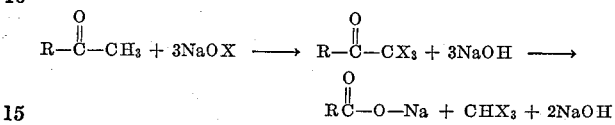

it has been impossible to isolate more than traces of the trihaloketone from this reaction. Since both the replacement step and the scission are catalyzed by a base, and since the replacement action produces sufficient base to complete the scission step, it would be expected that neither replacement nor scission would occur without base and that one could not be effected without the other.

However, it has now been found that when certain hypohalites are reacted with 1-halo-2-ketones, under essentially neutral conditions, the expected scission does not occur, and that high yields and conversions of 1,1,1-trihalo-2-ketones are obtained.

The process of the invention is carried out by mixing and reacting, in an essentially neutral medium, a hypohalite wherein the halogen has an atomic weight between 35 and 128 and a 1-halo-2-ketone having residual hydrogen satisfying the unhalogenated valences of the 1-carbon atom, i.e., a halomethylketone wherein the number of halogen atoms in the methyl group is one or two and the sum of the hydrogen and halogen atoms in the methyl group is three, wherein the atomic weight of the halogen is between 18 and 128, to cause substitution of hydrogen present on the 1-carbon atom of the starting compound by the halogen of the hypohalite. The process of the present invention is preferably carried out in an aqueous medium, since the water reacts with the halogen to form the hypohalite which serves as the halogenating agent in the hypohalogenation reaction. Other media in which hypohalite ions can be formed may also be used. Moreover, the presence of a large volume of water accomplishes another purpose. It acts as a solvent for the sodium chloride, for example, produced when the hypochlorination is carried out in the presence of sodium bicarbonate. This makes it possible to carry the hypohalogenation to the desired level of completion and facilitates recovery of the reaction products. However, it is possible to carry out the present reaction even if only a trace of water is present to assist in forming the hypohalite ion, since additional water results as a by-product of the reaction. Such trace amounts of water are normally present, for example, in reagent grade acetone which may be used as solvent. Moreover, the reaction may even proceed in the absence of water where a polar solvent is present which can furnish the hypochlorite ion in the presence of chlorine, as for example, acetone.

The preferred starting compounds of the present invention may be represented by the formula:

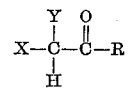

wherein X is chlorine, bromine, iodine, or fluorine, Y is bromine, fluorine, iodine, chlorine, or hydrogen, and R is a non-interfering organic radical attached through a carbon atom, particularly those compounds wherein R is a non-interfering hydrocarbon radical having from one to ten carbon atoms. This class includes hydrocarbon radicals substituted with non-interfering groups, such as alkoxy, nitro, and the like. Especially preferred starting compounds are those in which R is a lower alkyl radical having from one to eight carbon atoms, inclusive, i.e., lower-alkanones. Examples of compounds which may be used as starting materials are: 1-chloroacetone, 1,1-dichloroacetone, 1-bromoacetone, 1,1-dibromoacetone, 1-bromo-1-chloroacetone, 1-bromo-2-butanone, 1-chloro-2-butanone, 1,1-dichloro-2-butanone, 1,1-dibromo-2-butanone, 1-bromo-1-chloro-2-butanone, 1,1-difluoro-2-butanone, 1-bromo-1-fluoro-2-butanone, 1,1-difluoro-2-pentanone, 1-bromo-1-chloro-3-methyl-2-butanone, 1-bromo-1-fluoro-3-ethyl-2-pentanone, 1-chloro-2-heptanone, phenacylchloride, phenacylbromide, p-chlorophenacylchloride, 1,6-dichloro-2,5-hexadione, and the like. These starting compounds and others are known in the art and may be produced by a number of reactions, such as those given in U.S. Patents 2,243,484—Morey; 2,635,118—Gilbert; 2,824,139—Barnhart; and 2,905,712—Braumworth. The present invention finds particular use in the further halogenation of mixtures of halogenated ketones. The process of reacting free halogen with methyl ketones often gives mixtures of 1-halo-2-ketones. Such mixtures may be treated by the process of the present invention in order to give high yields of 1,1,1-trihalo-2-ketones.

Any of several different procedures may be employed for reacting the hypohalite halogenating agent of the present invention, e.g., the hypochlorite, hypobromite, or hypoiodite, with the starting 1-halo-2-ketone or 1,1-dihalo-2-ketone. In general, the reactants need merely be brought into contact with each other, and several procedures are available for such purpose, e.g., (a) the introduction of hypohalite directly into the reaction mixture, and (b) the generation of hypohalite in situ in the aqueous reaction medium.

Examples of (a) are:

(1) The hypohalite may be introduced as a salt, e.g., sodium hypochlorite, calcium hypochlorite, or magnesium hypobromite, (2) The hypohalite may be introduced as the acid, e.g., hypochlorous acid or hypobromous acid, (3) The hypohalite may be introduced in the form of certain organic compounds, e.g., an alkyl hypohalite such as tertiary butyl hypochlorite.

Examples of (b) are:

(1) The reaction of a base with a halogen, e.g.,

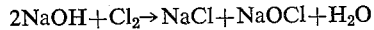

$2NaOH + Cl_2 \rightarrow NaCl + NaOCl + H_2O$

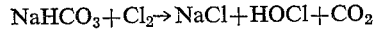

$NaHCO_3 + Cl_2 \rightarrow NaCl + HOCl + CO_2$ (2) The reaction of a metal oxide with a halogen, e.g.,

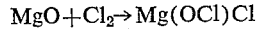

$MgO + Cl_2 \rightarrow Mg(OCl)Cl$ (Other metal oxides useful in this reaction are: zinc oxide, calcium oxide, silver oxide, copper oxide, and the like.)

(3) Th reaction of other, e.g., organic, compounds to yield hypohalites, e.g., the reaction of dichlorocyanuric acid, and salts of dichlorocyanuric acid and trichlorocyanuric acid, 1,3-dichloro-5,5-dimethylhydantoin or other compounds which will furnish active chlorine upon reaction with water, e.g.,

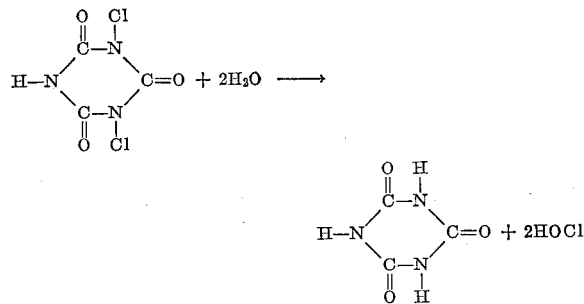

Since many of the 1-halo-2-ketones employed as starting materials are insoluble in water, a preferred procedure is to form an aqueous emulsion by adding the ketone to water with vigorous stirring, adjust the emulsion thus formed to a temperature of about 0° to 70° C., preferably from about 10° to 40° C., and then introduce the hypohalite. Many other equivalent procedures may be employed, e.g., the order of addition of the haloketone, water and bicarbonate may be interchanged, although the hypohalite must be added after all the other reactants are present in the reactor.

One of the most important considerations in carrying out the process of the present invention is the maintenance of the pH of the aqueous reaction mixture. It is essential that the pH be maintained at a value of about 6.0 to about 10.0, and preferably about 6.5 to about 8.0. If the pH rises to too high a value, the haloform reaction wil take place, with the resulting scission of the product. On the other hand, if the value of the pH becomes too low, the reaction will not proceed.

Since by-products are produced in the process of the present invention which tend to change the pH of the reaction mixture in one direction or the other, means must be provided for maintaining the pH within the desired range during the reaction. The mechanism of the present reaction is such that when a free halogen such as chlorine is passed into the system, it dissolves in and reacts with the water present, forming a hydrogen halide such as hydrogen chloride (HCl) and a hypohalite such as hypochlorous acid (HOCl). The latter material serves as the halogenation agent of the invention. If the by-products HCl were permitted to accumulate in the system, the pH would fall to a low value and the hypochlorination reaction would not proceed in the desired manner. Consequently, according to one embodiment of the invention, sodium bicarbonate is maintained in the system in excess in order to serve as an acid receptor and neutralize the acid formed. In this manner the pH is maintained in the desired range. If an insufficient amount of sodium bicarbonate is added, it will become completely used up, and the further formation of un-neutralized HCl will cause the pH to fall outside the optimum range. Other acid acceptors such as magnesium oxide, sodium carbonate, a mixture of sodium carbonate and sodium bicarbonate, magnesium carbonate, zinc oxide, and a mixture of sodium dihydrogen phosphate and disodium hydrogen phosphate may also be used.

Alternatively, when hypochlorination is accomplished by adding a hypochlorite in salt form such as sodium hypochlorite or calcium hypochlorite, the hypochlorite solution continually tends to become more basic, and requires the continuous incremental addition of an acid such as phosphoric acid to maintain the pH within the desired range.

Among the methods which may be used to maintain the pH of the reaction mixture within the desired range are the following:

(1) Continuous incremental addition of acid, as by adding phosphoric acid, to maintain a desired reading on a pH meter when the hypochlorite is added in salt form, such as sodium hypochlorite or calcium hypochlorite. In this form, the hypochlorite solution is basic and requires the continuous addition of an acid to maintain the pH within the desired range.

(2) Conducting the reaction in a buffered solution, such as a solution containing sodium dihydrogen phosphate and disodium hydrogen phosphate.

(3) Utilizing a method of generating hypohalite in which the acid formed by solution of chlorine in water is continuously neutralized by reaction with an acid salt such as sodium bicarbonate.

(4) Utilizing a method of generating hypohalite in which the acid formed by solution of the halogen in water is continuously neutralized by reaction with the oxide of a metal which forms an amphoteric hydroxide, such as the reaction of magnesium oxide with the hydrohalide.

(5) Adding hypochlorous acid (HOCl) itself while maintaining the pH within the desired range by the presence of a buffer in the solution.

Of these procedures for controlling pH, those designated 3 and 4 are preferred.

Other reaction conditions do not appear to be particularly critical. Pressure may vary without affecting the products to any great extent. The basic hypohalogenation reaction appears to be almost instantaneous. However, practically, time limitations are imposed upon the reaction by physical limitations on addition rate and heat of reaction dissipation. The only requirement in regard to reaction time is that for optimum yields, it be sufficient for the reaction to go to completion. Usually, when the hypohalite is introduced directly, the reaction is complete in thirty minutes to an hour and, when the hypohalite is generated in situ, in ninety minutes or more. Although recovery and purification of the desired product may be effected in any one of various ways, the insolubility of 1,1,1-trihalo-2-ketones in water simplifies the recovery of the desired reaction products. The organic portion of the reaction product may, for example, be collected by separation or decantation and, after the initial separation, the aqueous portion may be extracted with an organic solvent, such as benzene, carbon tetrachloride, chloroform, or the like, in order to remove any small amounts of trihalo-ketone that may be in solution, the mixture separated, and the organic portion combined with the extracts. The combined organic portions may then be distilled to separate starting material, small quantities of haloform, and the organic solvent used for the extraction, from the desired product.

The following examples are given by way of illustration only and are not to be construed as limiting.

The reaction products in the following examples were all analyzed using standard gas-liquid chromatographic procedures.

*Example 1*

One thousand milliliters of 1 N sodium hypochlorite solution were introduced into a reaction vessel containing an emulsion formed by mixing 1 mole (127 grams) of 1,1-dichloroacetone and 300 ml. of water. During the addition, which was carried out over a period of 34 minutes, the emulsion was maintained at from 11° to 22° C. by placing the reaction vessel in a cool water bath, and phosphoric acid was added simultaneously in such a manner as to maintain the pH of the emulsion at 7 to 7.1 as read on a pH meter.

After addition was complete, the mixture was stirred for fifteen minutes and the lower layer, a colorless liquid, was separated. The upper layer was extracted with 200 ml. of benzene, the extract combined with the main product, and the combined product dried with anhydrous magnesium sulfate and distilled. By this method 117 grams, 73 percent of the theoretical yield, of 1,1,1-trichloroacetone were obtained. There was no significant residue and only traces of chloroform were detectable by gas chromatography.

*Example 2*

One mole (127 grams) of 1,1-dichloroacetone and hypochlorous acid were mixed and reacted according to the procedure of Example 1, the reaction temperature being maintained between 2° and 12° C. and the pH being maintained at about neutrality by conducting the reaction in a standard buffer solution of sodium dihydrogen phosphate and disodium hydrogen phosphate. The product comprised 60% pure 1,1,1-trichloroacetone, about 12% of a mixture of 1,1-dichloroacetone and 1,1,1-trichloroacetone, and about 15% residue composed of 80% 1,1,1-trichloroacetone.

*Example 3*

A mixture of 2 moles (254 grams) of 1,1-dichloroacetone, 1 liter of water, and 3 moles (252 grams) of sodium bicarbonate was prepared in a reaction vessel and saturated with carbon dioxide. The temperature of the mixture was reduced to 6° C. and 2.66 moles (189 grams) of chlorine added over a period of two hours and twenty minutes. The mixture was allowed to stand for about one hour, whereafter the lower organic layer was separated and distilled. The following fractions were obtained: chloroform, 18 grams; intermediate, 25 grams; 1,1,1-trichloroacetone, 218 grams; and distillation residue, 40 grams. With allowance for 1,1,1-trichloroacetone (boiling point 135 degrees centigrade) in the intermediate and residue, the yield was 250 grams or 75% of theory.

*Example 4*

A mixture of 2 moles (254 grams) of 1,1-dichloroacetone, 1 liter of water, and 2.2 moles (88 grams) of magnesium oxide was prepared in a reaction vessel. The temperature of the mixture was reduced to 12° C. and 2.2 moles (156 grams) of chlorine added over a period of two hours. An additional ten grams of chlorine were added and the mixture acidified with 100 milliliters of concentrated hydrochloric acid. The products of the reaction which were collected by extraction and distillation as in Example 3 were: chloroform, 17 grams; intermediate, 12 grams; 1,1,1-trichloroacetone, 229 grams; and distillation residue, 9 grams. The yield, corrected for product in the intermediate and residue, was 241 grams or 75 percent of theory.

*Example 5*

A solution of 0.29 mole (50 grams) of calcium hypochlorite was added to a mixture of 0.5 mole (63.5 grams) of 1,1-dichloroacetone and 250 ml. of water. The reaction mixture was maintained at a temperature of 18° to 22° C. by means of a water bath and at a pH below 7.5, by means of addition of phosphoric acid. The reaction mixture was purified by filtration, separated, and the aqueous phase and solids extracted with 200 ml. of benzene. Analysis by vapor phase chromatography indicated the product to be 1,1,1-trichloroacetone, with some starting material and chloroform present.

*Example 6*

A mixture of 2 moles (254 grams) of 1,1,-dichloroacetone, 1 liter of water, and 1.5 moles (126.5 grams) of magnesium carbonate was prepared in a reaction vessel. The solution was maintained at 23° to 27° C. while 2.65 moles (190 grams) of chlorine were added over a period of two hours. The products of the reaction which were collected as in Example 3 were: chloroform, 10 grams; intermediate, 28 grams; 1,1,1-trichloroacetone, 193 grams; and distillation residue, 32 grams. The yield, corrected, was 60% of theory.

*Example 7*

A mixture of 2 moles (254 grams) of 1,1-dichloroacetone, 1 liter of water, and 2.7 moles (270 grams) of calcium carbonate was prepared in a reaction vessel. The temperature of the mixture was maintained at 21° to 26° C. as 3 moles (213 grams) of chlorine were added over a period of six hours. The products of the reaction which were collected as in Example 3 were: chloroform, 8 grams; intermediate, 39 grams; 1,1,1-trichloroacetone, 177 grams; and distillation residue, 39 grams. The yield, corrected, was 55% of theory.

*Example 8*

A mixture of 258 moles (32,800 grams) of 1,1-dichloroacetone, 75 ml. of water and 310 moles (26,040 grams) of sodium bicarbonate was prepared in a reaction vessel. The temperature of the mixture was maintained at 30° C. as 287 moles (20,400 grams) of chlorine were added at the rate of 3,600 grams per hour. The reaction mixture was allowed to stand for ten minutes, whereafter the lower organic layer was separated and analyzed by gas-liquid chromatography. The analysis showed that 85% of the 1,1-dichloroacetone had been converted to 1,1,1-trichloroacetone and that 93% of the 1,1-dichloroacetone which reacted had become 1,1,1-trichloroacetone.

Example 9

A mixture of 1 mole (127 grams) of 1,1-dichloroacetone, 500 ml. of water, and 0.5 mole (40.7 grams) of zinc oxide was prepared in a reaction vessel. The temperature of the mixture was maintained between 5° and 20° C. as 1 mole (72 grams) of chlorine was added over a period of one hour and forty minutes. The reaction mixture was stirred for forty minutes and thereafter allowed to stand, separated and analyzed by vapor phase chromatography. The reaction yielded 135 grams of oil which was mostly 1,1,1-trichloroacetone.

Example 10

A mixture of 1 mole (92 grams) of 1-chloroacetone (containing about 2–5% of 1,1-dichloroacetone), 630 ml. water, and 2.5 moles (210 grams) sodium bicarbonate was prepared in a reaction vessel. The temperature of the mixture was raised to 30° C. and 2.3 moles (163 grams) of chlorine added over a period of one hour and fifty minutes. Stirring was continued until the reaction was completed. The lower heavy oil layer (134 grams) was separated and the composition determined by gas-liquid chromatography. The following fractions were obtained: chloroform, 11.6%; 1,1-dichloroacetone, 1.34%; 1,1,1-trichloroacetone, 72.7%; 1,1,3-trichloroacetone, 0.08%; tetrachloroacetone, 0.2%; and pentachloroacetone, 0.3%. The yield of 1,1,1-trichloroacetone was 73.5% of theory.

Example 11

A mixture of 7 moles (889 grams) of 1,1-dichloroacetone, 3 liters of water, and 7.5 moles (630 grams) of sodium bicarbonate was prepared in a reaction vessel. The temperature of the mixture was maintained in the range of fifteen to thirty-four degrees centigrade while 7 moles (1120 grams) of bromine was added over a period of nine hours. The heavy lower layer (1322 grams) was separated. The upper layer was extracted with 500 ml. benzene, and the extract dried with calcium chloride and distilled. The residue of 92 grams was a mixture of at least 50% 1-bromo-1,1-dichloroacetone, benzene and 1,1-dichloroacetone, and some bromodichloromethane. Fractional distillation of the lower layer gave:

| | Grams | Boiling Range |
|---|---|---|
| Bromodichloromethane | 41 | 26–57.5° (100 mm.). |
| 1,1-dichloroacetone (approx. 4%) | 46 | 57.5–86° (100 mm.). |
| Mixture of 1,1-dichloroacetone and 1-bromo-1,1-dichloroacetone. | 56 | 86–94° (100 mm.). |
| 1-bromo-1,1-dichloroacetone (78%) | 1,126 | 94–95° (100 mm.). |
| 1-bromo-1,1-dichloroacetone plus impurity. | 35 | |

The conversion, corrected, was 85% of theory and the yield was 95% of theory. About 10% of the unreacted starting material (1,1-dichloroacetone) was recovered.

Example 12

A mixture of 0.552 pound mole (72.3 pounds) of 1,1-dichloroacetone, 165 pounds of water, and 0.685 pound mole (57.5 pounds) of sodium bicarbonate was prepared in a reaction vessel. The temperature of the mixture was adjusted to 30° C. and 0.634 pound mole (45 pounds) of chlorine added at the rate of 8 pounds per hour. The reaction mixture was stirred for ten minutes after all chlorine had been added and thereafter allowed to stand until the layers separated. The heavy oily layer (86.3 pounds) was analyzed by a gas-liquid chromatographic method. Eighty-five percent of the 1,1-dichloroacetone had been converted to 1,1,1-trichloroacetone with a yield of 93%.

Example 13

Utilizing the process described in Example 11, an aqueous reaction mixture of 1,1-dichloroacetone and sodium bicarbonate was reacted with iodine, and the reaction product was subsequently purified, yielding 1,1-dichloro-1-iodoacetone.

The products of the present invention are valuable intermediates for the preparation of various useful compounds such as medicinals. For example, 1,1,1-trichloroacetone is a useful intermediate in the preparation of Isopral (1,1,1-trichloroisopropanol) which is used as a somnifacient, as described in the Dispensatory of the United States of America, 23rd Edition, 1943, 1410. It is stated to have about the same therapeutic effect as chloral hydrate.

Various modifications and equivalents will be apparent to one skilled in the art and may be made in the process of the present invention without departing from the spirit or scope thereof, and it is therefore to be understood that the invention is to be limited only by the scope of the appended claims.

I claim:

1. A process for the production of a 1,1,1-trihalo-2-lower-alkanone which comprises reacting a starting material consisting essentially of a 1-halo-2-lower-alkanone having at least one hydrogen atom bonded to the 1-carbon atom with a hypohalite in an aqueous medium, the halogen of said hypohalite having an atomic weight of at least 35, at a temperature within the range of about 0° to about 70° C., while maintaining the pH of the reaction mixture within the range of about 6 to about 10.

2. A process according to claim 1 wherein the reaction is carried out at a temperature within the range of about 10° to about 40° C.

3. A process according to claim 1 wherein the pH is maintained within a range of about 6.5 to about 8.

4. A process according to claim 1 wherein said 1-halo-2-lower-alkanone is a 1-chloro-2-lower-alkanone.

5. A process according to claim 1 wherein said 1-halo-2-lower-alkanone is a 1,1-dichloro-2-lower-alkanone.

6. A process according to claim 1 wherein said 1,1,1-trihalo-2-lower-alkanone is 1,1,1-trichloroacetone and said 1-halo-2-lower-alkanone is selected from the group consisting of 1-chloroacetone, 1,1-dichloroacetone, and mixtures thereof.

7. A process according to claim 1 wherein the pH of the reaction mixture is maintained within the stated range by providing an excess of sodium bicarbonate in the reaction mixture.

8. A process according to claim 1 wherein said hypohalite is produced in situ by passing free halogen into the reaction mixture.

9. A process for the production of a 1,1,1-trihalo-2-ketone having the formula:

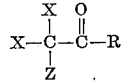

wherein each X is a halogen, Z is a halogen having an atomic weight of at least 35, and R is a non-interfering organic radical attached through a carbon atom and selected from the group consisting of lower-alkyl, phenyl, halophenyl, and 4-chloro-3-keto butyl, which includes the step of reacting a starting material consisting essentially of a 1-halo-2-ketone having the formula:

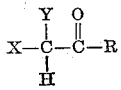

wherein X and R have the values previously assigned, and wherein Y is a member of the class consisting of hydrogen and halogen with a hypohalite, wherein the halogen of said hypohalite has an atomic weight of at least 35, in an aqueous reaction medium at a temperature within the range of about 0° to about 70° C., while maintaining the pH within a range of about 6 to about 10.

10. A process according to claim 9, wherein a buffer is incorporated into the reaction mixture for maintaining the pH within the stated range.

11. A process according to claim 9, wherein an excess of sodium bicarbonate is provided in the reaction mixture to maintain the value of the pH within the desired range, and said hypohalite is formed in situ by introducing a free halogen into the reaction mixture and permitting it to react with the water present.

12. A process according to claim 9, wherein all said halogen atoms are chlorine atoms.

13. A process according to claim 9, wherein said hypohalite is hypobromous acid.

14. A process according to claim 9, wherein said hypohalite is hypoiodous acid.

15. A process according to claim 9, wherein said hypohalite is a hypochlorite salt and the pH of the reaction mixture is maintained within the stated range by adding an acid during the reaction as required.

16. A process for the production of a 1,1,1-trihalo-2-lower-alkanone which comprises introducing a free halogen having an atomic weight of at least 35 into an aqueous reaction mixture comprising a 1-halo-2-lower-alkanone and a buffer at a temperature within the range of about 0° to about 70° C., said buffer being present in an amount sufficient to maintain the pH of the reaction mixture at a value in the range of about 6 to about 10.

17. A process for the production of 1,1,1-trichloroacetone which comprises introducing chlorine into an aqueous reaction mixture containing sodium bicarbonate and a material selected from the group consisting of 1-chloroacetone, 1,1-dichloroacetone, and mixtures thereof at a temperature within the range of about 0° to about 70° C., the amount of sodium bicarbonate being sufficient to maintain the pH of the reaction mixture at a value within the range of about 6 to about 10.

18. A process according to claim 17, wherein the temperature of the reaction is maintained within a range of about 10° to 40° C., and the pH is maintained within a range of about 6.5 to 8.

19. A process for the production of 1-bromo-1,1-dichloroacetone which comprises reacting 1,1-dichloroacetone with bromine in the presence of water at a temperature within the range of about 0° to about 70° C., while maintaining the pH of the reaction mixture within the range of about 6 to about 10.

20. A process for the production of 1,1-dichloro-1-iodoacetone which comprises reacting 1,1-dichloroacetone with iodine in the presence of water at a temperature within the range of about 0° to about 70° C., while maintaining the pH of the reaction mixture within the range of about 6 to about 10.

References Cited

UNITED STATES PATENTS 2,199,934   5/1940   Heisel et al. _____ 260—593

OTHER REFERENCES

Fieser et al.: Organic Chemistry, 3rd edition, pp. 154–155, (1956).

LEON ZITVER, *Primary Examiner.*

DANIEL D. HORWITZ, *Examiner.*